(12) United States Patent
Mukherjee et al.

(10) Patent No.: US 9,875,259 B2
(45) Date of Patent: Jan. 23, 2018

(54) DISTRIBUTION OF AN OBJECT IN VOLATILE MEMORY ACROSS A MULTI-NODE CLUSTER

(71) Applicant: Oracle International Corporation, Redwood Shores, CA (US)

(72) Inventors: Niloy Mukherjee, Belmont, CA (US); Tirthankar Lahiri, Palo Alto, CA (US); Vineet Marwah, San Ramon, CA (US); Kartik Kulkarni, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 371 days.

(21) Appl. No.: 14/565,906

(22) Filed: Dec. 10, 2014

(65) Prior Publication Data

US 2016/0026660 A1    Jan. 28, 2016

Related U.S. Application Data

(60) Provisional application No. 62/027,535, filed on Jul. 22, 2014.

(51) Int. Cl.
*G06F 17/30* (2006.01)
*G06F 12/02* (2006.01)

(52) U.S. Cl.
CPC ...... *G06F 17/30289* (2013.01); *G06F 12/023* (2013.01); *G06F 17/3033* (2013.01); *G06F 17/30566* (2013.01); *G06F 2212/251* (2013.01)

(58) Field of Classification Search
CPC .............. G06Q 10/10; G06F 17/30286; G06F 17/30959

USPC ......... 707/652, 713, 769, 803; 711/129, 216
See application file for complete search history.

(56) References Cited

U.S. PATENT DOCUMENTS

| 5,692,174 A | 11/1997 | Bireley |
| 6,009,432 A | 12/1999 | Tarin |
| 7,010,789 B1 | 3/2006 | Kimelman |
| 7,188,113 B1 | 3/2007 | Thusoo |

(Continued)

FOREIGN PATENT DOCUMENTS

EP    2 608 070 A1    6/2013

OTHER PUBLICATIONS

Schaffner, et al., "A Hybrid Row-Column OITP Database Architecture for Operational Reporting", dated 2009, 14 pages.

(Continued)

*Primary Examiner* — Jeffrey A Burke
*Assistant Examiner* — Thong Vu
(74) *Attorney, Agent, or Firm* — Hickman Palermo Becker Bingham LLP

(57) ABSTRACT

Techniques are described herein for distributing distinct portions of a database object across the volatile memories of a plurality of nodes in a clustered database system. The techniques involve establishing a single database server instance located on a node in a multi-node cluster as a load-operation master for a particular data set. The load-operation master determines how the data set may be separated into chunks using a hash function. The load-operation master then broadcasts a small payload of consistency information to other database servers, so each database server may independently execute the hash function and independently load their respectively assigned chunks of data.

26 Claims, 7 Drawing Sheets

(56) References Cited

U.S. PATENT DOCUMENTS

| | | | |
|---|---|---|---|
| 7,647,329 B1* | 1/2010 | Fischman | G06F 17/30094 |
| | | | 707/999.1 |
| 7,849,221 B2 | 12/2010 | Kumar | |
| 8,433,684 B2 | 4/2013 | Munoz | |
| 9,396,202 B1* | 7/2016 | Drobychev | G06F 17/30174 |
| 2002/0194157 A1 | 12/2002 | Zait | |
| 2003/0229640 A1 | 12/2003 | Carlson | |
| 2004/0098372 A1 | 5/2004 | Bayliss | |
| 2004/0215904 A1 | 10/2004 | Gopisetty | |
| 2005/0033818 A1 | 2/2005 | Jardin | |
| 2005/0055380 A1 | 3/2005 | Thompson et al. | |
| 2005/0131893 A1 | 6/2005 | Von Glan | |
| 2005/0187977 A1 | 8/2005 | Frost | |
| 2006/0013078 A1 | 1/2006 | Goodman | |
| 2006/0182046 A1 | 8/2006 | Dageville | |
| 2008/0059492 A1 | 3/2008 | Tarin | |
| 2008/0065591 A1 | 3/2008 | Guzenda | |
| 2008/0235280 A1 | 9/2008 | Schoen | |
| 2008/0281784 A1 | 11/2008 | Zane et al. | |
| 2009/0037495 A1* | 2/2009 | Kumar | G06F 17/3048 |
| 2009/0043910 A1 | 2/2009 | Barsness | |
| 2009/0063516 A1 | 3/2009 | Wang | |
| 2010/0106711 A1 | 4/2010 | Graefe | |
| 2010/0235335 A1 | 9/2010 | Heman et al. | |
| 2011/0029569 A1 | 2/2011 | Ganesh et al. | |
| 2011/0099351 A1* | 4/2011 | Condict | G06F 3/0608 |
| | | | 711/216 |
| 2011/0138123 A1 | 6/2011 | Gurajada et al. | |
| 2011/0196822 A1* | 8/2011 | Zunger | G06F 17/30575 |
| | | | 707/609 |
| 2011/0196828 A1* | 8/2011 | Drobychev | G06F 17/30581 |
| | | | 707/622 |
| 2011/0196833 A1* | 8/2011 | Drobychev | G06F 17/30575 |
| | | | 707/634 |
| 2012/0078951 A1* | 3/2012 | Hsu | G06F 17/30445 |
| | | | 707/769 |
| 2012/0173515 A1 | 7/2012 | Jeong et al. | |
| 2012/0310916 A1* | 12/2012 | Abadi | G06F 17/30445 |
| | | | 707/713 |
| 2012/0323971 A1 | 12/2012 | Pasupuleti | |
| 2013/0275364 A1 | 10/2013 | Wang | |
| 2013/0332590 A1* | 12/2013 | Mohaban | G06Q 10/10 |
| | | | 709/223 |
| 2014/0040218 A1 | 2/2014 | Kimura et al. | |
| 2014/0040237 A1* | 2/2014 | Chen | G06F 17/30516 |
| | | | 707/722 |
| 2014/0075493 A1 | 3/2014 | Krishnan et al. | |
| 2014/0114952 A1 | 4/2014 | Robinson | |
| 2014/0149357 A1* | 5/2014 | Gupta | G06F 17/30008 |
| | | | 707/652 |
| 2014/0372702 A1* | 12/2014 | Subramanyam | G06F 12/0848 |
| | | | 711/129 |
| 2015/0006846 A1* | 1/2015 | Youngworth | G06F 3/0689 |
| | | | 711/216 |
| 2015/0088830 A1 | 3/2015 | Kamp et al. | |
| 2015/0089125 A1 | 3/2015 | Mukherjee et al. | |
| 2015/0100574 A1* | 4/2015 | Presta | G06F 17/30584 |
| | | | 707/737 |
| 2015/0142733 A1* | 5/2015 | Shadmon | G06F 17/30289 |
| | | | 707/609 |
| 2015/0234895 A1 | 8/2015 | Erdogan | |
| 2015/0261792 A1* | 9/2015 | Attarde | G06F 17/30303 |
| | | | 707/616 |
| 2015/0339350 A1 | 11/2015 | Baggett | |
| 2016/0026667 A1 | 1/2016 | Mukherjee et al. | |
| 2016/0036905 A1 | 2/2016 | Syed | |
| 2016/0048572 A1 | 2/2016 | Khandelwal | |
| 2016/0350363 A1 | 12/2016 | Raja et al. | |
| 2017/0031988 A1 | 2/2017 | Sun | |
| 2017/0039137 A1 | 2/2017 | Mukherjee et al. | |
| 2017/0242767 A1 | 8/2017 | Wang | |

OTHER PUBLICATIONS

Ramamurthy, Ravishankar, "A Case for Fractured Mirrors" Proceedings of the 28th VLDB Conference, dated, 2002, 12 pages.

Farber et al., "SAP HANA Database—Data Management for Modern Business Applications", SIGMOD Record, dated Dec. 2011, vol. 40, No. 4, 8 pages.

U.S. Appl. No. 14/337,179, filed 074/21/2014, Notice of Allowance, dated Jul. 29, 2015.

U.S. Appl. No. 14/337,179, filed Jul. 21, 2014, Notice of Allowance, dated Nov. 3, 2015.

Mukherjee, U.S. Appl. No. 14/820,672, filed Aug. 7, 2015, Notice of Allowance, dated Dec. 19, 2016.

Muhkherjee, U.S. Appl. No. 14/806,411, filed Jul. 22, 2015, Office Action, dated Oct. 4, 2017.

\* cited by examiner

CHUNK-TO-NODE MAPPING

| CHUNK | START ADDR | END ADDR | HOST NODE |
|---|---|---|---|
| CHUNK 302 | 330 | 336 | NODE 102 |
| CHUNK 304 | 336 | 342 | NODE 112 |
| CHUNK 306 | 342 | 350 | NODE 122 |

FIG. 3B

DISTRIBUTION OF AN OBJECT IN VOLATILE MEMORY ACROSS A MULTI-NODE CLUSTER

RELATED APPLICATION DATA AND CLAIM OF PRIORITY

This application claims the benefit of U.S. Provisional Application No. 62/027,535 entitled Distribution Of An Object In Volatile Memory Across A Multi-Node Database, filed Jul. 22, 2014, the contents of which are incorporated by reference for all purposes as if fully set forth herein.

FIELD OF THE INVENTION

The present invention relates to data storage and retrieval techniques in a multi-node cluster, and more specifically to the automatic distribution of distinct portions of a database object across the volatile memory of multiple nodes.

BACKGROUND

Database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be loaded into volatile memory. Various approaches for loading entire database objects, or selected portions thereof, into volatile memory to speed up query processing are described in U.S. patent application Ser. No. 14/377,179, entitled "Mirroring, In Memory, Data From Disk To Improve Query Performance", filed Jul. 21, 2014, referred to herein as the "Mirroring" application, the contents of which are incorporated herein in its entirety.

According to the approaches described in the Mirroring application, data objects, or portions thereof, are stored in volatile memory in a different format than the format that those same objects have on disk. For example, the in-memory version of the objects may be in a column-major format, while the on-disk version stored data in a row-major format. The in-memory version of the object (or selected portions thereof), is referred to as an In-Memory Compression Unit (IMCU) because the data contained therein is often compressed.

In a clustered database system, multiple "nodes" have access to the same on-disk copy of a database. Typically, each node is a computing device with its own local memory and processors that are running one or more database server instances. The database server instances on each of the nodes may receive queries to access the database. The speed at which a given database server instance is able to answer a query is based, at least in part, on whether the node on which the database server instance is running has the requested data cached within its local volatile memory. Consequently, to improve every node's performance of queries that access data in a Table X, Table X may be loaded into the volatile memory of every node in the cluster.

Unfortunately, loading the same data (e.g. Table X) into the volatile memory of every node in a cluster of N nodes means that the cluster can only cache approximately the same amount of data as a single node, even though a cluster of N nodes has N times the amount of volatile memory as a single node.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3B is a block diagram illustrating a chunk to node mapping;

DETAILED DESCRIPTION

In the following description, for the purposes of explanation, numerous specific details are set forth in order to provide a thorough understanding of the present invention. It will be apparent, however, that the present invention may be practiced without these specific details. In other nodes, well-known structures and devices are shown in block diagram form in order to avoid unnecessarily obscuring the present invention.

General Overview

Techniques are described herein for distributing distinct portions of database objects across the volatile memories of a plurality of nodes in a clustered database system. The portion of a database object that is assigned to any given node is referred to herein as a "chunk". In some embodiments, within the volatile memory of a node, each such chunk is encapsulated in a distinct IMCU. In alternative embodiments, the in-memory representation of a chunk may have other formats, including the same format in which the data for the chunk is represented on disk. Distributing distinct chunks of the database objects across the nodes avoids the situation in which the same data is consuming volatile memory in every one of the nodes.

In addition, techniques are described herein that allow each node to determine which chunks have been assigned to each node in the cluster, without having to centralize the task of keeping track of the chunk-to-node mapping. In one embodiment, each node is able to independently determine the correct node that is assigned to any given chunk of a database object whose chunks have been distributed among the volatile memories of the various nodes of the cluster.

System Overview

Figure 1:
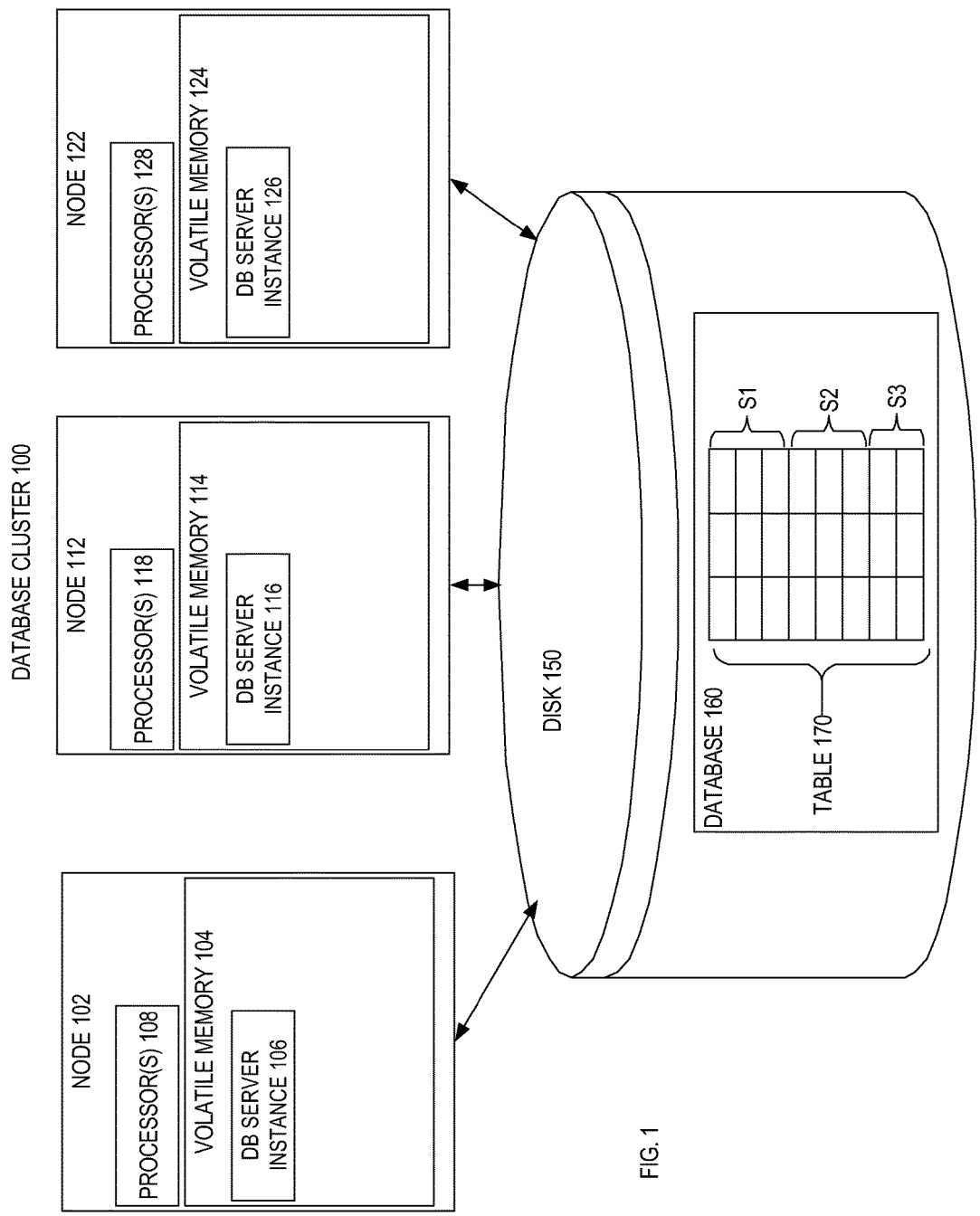
FIG. 1 is a block diagram illustrating a system architecture of a database cluster.

Referring to FIG. 1, it is a block diagram that depicts a database cluster 100 according to one embodiment. In the embodiment illustrated in FIG. 1, three nodes 102, 112 and 122 have access to the same database 160. For the purpose of illustration, database 160 is shown as stored on a single shared disk 150, but in alternative embodiments may be spread across multiple disks to which each of nodes 102, 112 and 122 have access.

Nodes 102, 112 and 122 respectively have one or more processors 108, 118 and 128, and local volatile memory 104, 114 and 124. In addition, nodes 102, 112 and 122 are respectively executing database server instances 106, 116 and 126. While in the illustrated embodiment each node is executing a single database server instance, in alternative embodiments a single node may execute more than one database server instance.

Database 160 includes a table 170. Each of nodes 102, 112 and 122 is able to access data items from table 170 from the copy of table 170 that resides on disk 150. However, it is much faster for any given database server instance to access data items of table 170 that are cached in the volatile memory that resides on the node in which the database server instance is executing.

Table 170 is composed of three segments (S1, S2 and S3), where a "segment" is one or more extents, and where an "extent" is a contiguous series of on-disk data blocks. According to one embodiment, if segment S1 of table 170 has been designated as "in-memory enabled", distinct chunks of segment S1 are loaded into each of volatile memories 104, 114 and 124. The loading of the chunks of segment S1 into volatile memories 104, 114 and 124 may be performed pro-actively, or on an as-needed basis. How nodes 102, 112 and 122 determine which chunks of segment S1 are to be loaded into each of nodes 102, 112 and 122 shall be described in greater detail hereafter.

For the purpose of illustration, individual segments of a table are divided into chunks that are distributed among the various nodes of a multi-node system. However, entire table partitions, or entire tables, may be memory-enabled and divided into chunks that are distributed among the various nodes of a multi-node system. The granularity at which the chunks are determined may vary from implementation to implementation, and the techniques described herein are not limited to any particular level of granularity.

Factors in Distributing Chunks of a Database Object Among Nodes

When loading distinct chunks of a segment into the volatile memory of multiple nodes, various factors are taken into account to improve overall query processing performance. For example, during query processing, it is desirable for each of nodes 102, 112 and 122 to perform, in parallel, an approximately equal amount of work. To increase the likelihood that the query processing workload will be balanced, it is desirable for each of nodes 102, 112 and 122 to have approximately the same amount of data from the segment.

In addition, it is important for the distribution scheme to be able to handle situations in which a node fails and/or new nodes are added to the cluster 100. Ideally, rebalancing the workload when such events occur should involve as little downtime and as little inter-node traffic as possible.

Further, it is desirable to minimize cross-node communication required for each of the nodes to determine which chunks are assigned to each of the other nodes. As shall be described in greater detail hereafter, such cross-node communication is minimized by decentralizing the chunk-to-node mapping functions so that each node may independently determine the same chunk-to-node mapping.

Ideally, whether chunks of a segment are distributed across multiple nodes in a cluster should be transparent to the database applications that are sending queries to the cluster. Consequently, techniques are described herein where database applications can send queries that target a memory-enabled segment without having to know or specify which node(s) have the in-memory version of the segment. Such queries may be sent to the database server instance on any of the cluster's nodes, and that database server instance will return the correct results regardless of whether chunks of the in-memory version of the segment are distributed across multiple nodes.

Lock Managers

According to one embodiment, the locks for any given segment are managed by one of the nodes in the cluster. The node that manages the locks for a segment is referred to herein as the "lock-manager" for that segment. According to one embodiment, the segment-to-lock-manager mapping is based on an identifier associated with the segment. Consequently, given the segment identifier, any node in the cluster 100 is able to determine the lock manager for of any segment.

For the purposes of illustration, it shall be assumed that the lock managers for segments S1, S2 and S3 of table 170 are nodes 102, 112 and 122, respectively. As shall be described in greater detail hereafter, the lock-manager for a segment will receive a lock request from one or more nodes in response to occurrence of an event that triggers the loading of the segment. Events that trigger the loading of a segment are referred to herein as "load-segment events".

Load-Segment Events

A load-segment event is an event that triggers the loading, into volatile memory, of a segment. Various events may trigger the loading of a segment of a memory-enabled object into volatile memory. For example, in some cases, a segment of a memory-enabled object may be loaded into volatile memory upon system start up. In other cases, loading a segment of a memory-enabled object into volatile memory may be triggered by receiving a query that targets data items from the segment of the memory-enabled object. In yet other cases, a database application may submit an explicit request for a particular segment of a memory-enabled object to be loaded into volatile memory. The techniques described herein are not limited to any particular load-segment event.

According to one embodiment, a load-segment event includes a node determining that the segment has not already been loaded into the volatile memory of any node. Such a check may involve inspecting metadata, within the volatile memory of the node performing the check, that indicates which segments have been loaded by any node.

Becoming Load-Operation Master

In a multi-node cluster, a load-segment event for the same segment may concurrently occur in multiple database server instances. For example, a load-segment event for segment S1 of table 170 may occur in both database server instances 116 and 126. According to one embodiment, each of database server instances 116 and 126 responds to occurrence of their respective load-segment event by attempting to obtain an exclusive lock to become the "master" of the load-segment operation for segment S1. The master of a load-segment operation is referred to herein as the "load-operation master". In the present example, because node 102 is the lock manager for segment S1, database server instances 116 and 126 would send a lock request to node 102. An exclusive lock that enables a database server instance to become the master of a load-segment operation is referred to herein as "load-master lock."

For any given load-segment operation, the lock manager of the segment grants only one database server instance the load-master lock. The database server instance that is granted the load-master lock thereby becomes the load-segment master. For the purpose of explanation, it shall be assumed that database server instance 126 on node 122 is granted the load-master lock for segment S1, and that the request from database server instance 116 is declined. In response to having its request declined, database server instance 116 ceases to wait for the load-master lock.

Dividing the Target Segment into Chunks

The database server instance that becomes the load-operation master for a particular segment is responsible for coordinating the loading of that segment into volatile memory. According to one embodiment, the load-operation master reads from a shared disk (e.g. disk 150) metadata that is associated with the segment that is to be loaded. The segment to be loaded is referred to herein as the "target segment".

The metadata associated with the target segment defines the extents that belong to the target segment. Because the disk blocks of an extent are contiguous, an extent may be defined, for example, by (a) the address of the first block in the extent and (b) the length of the extent.

In addition to reading the metadata, the load-operation master determines the desired size and number of chunks for the target segment. A chunk is a set of data, from the target segment, that is to be loaded into the same in-memory container. The number of chunks need not be based on the number of extents in the target segment. Various factors may be used to determine the desired number of chunks, including, for example, the number of nodes in the cluster.

For the purpose of explanation, it shall be assumed that the in-memory containers for the segment will be in-memory compression units. Because the contents of in-memory compression units may be compressed, the size the data occupies on disk is not necessarily the same size that the data will occupy in an in-memory compression unit. Thus, a predicted in-memory size of the data may also be a factor used to determine the on-disk size of the chunks. For example, one rule for breaking up a target segment may be that the predicted in-memory size of each chunk may not fall below a certain threshold size. Such a rule would ensure that a target segment is not divided into chunks that are so small that the benefit that results from distributing the chunks among distinct nodes does not outweigh the overhead costs of distributing the work among so many nodes. In one embodiment, for example, the decision about how to devide the target segment into chunks may be (a) if pims/N>min_size, then divide segment into N equal-sized chunks, and (b) if pims/N<min_size, then divide segment into M equal-sized chunks, where:

"pims" is the predicted in-memory size of the target segment

Figure 2:
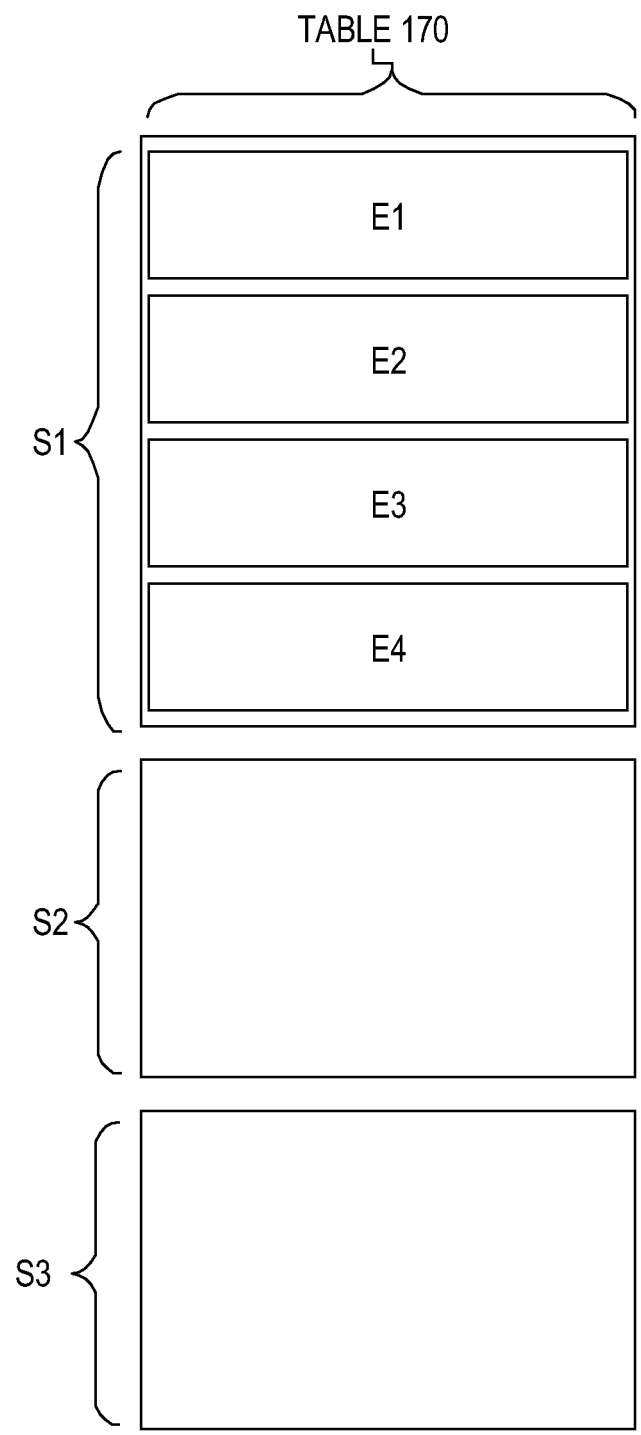
FIG. 2 is a block diagram illustrating a database object composed of segments and segments composted of extents.
Figure 3A:
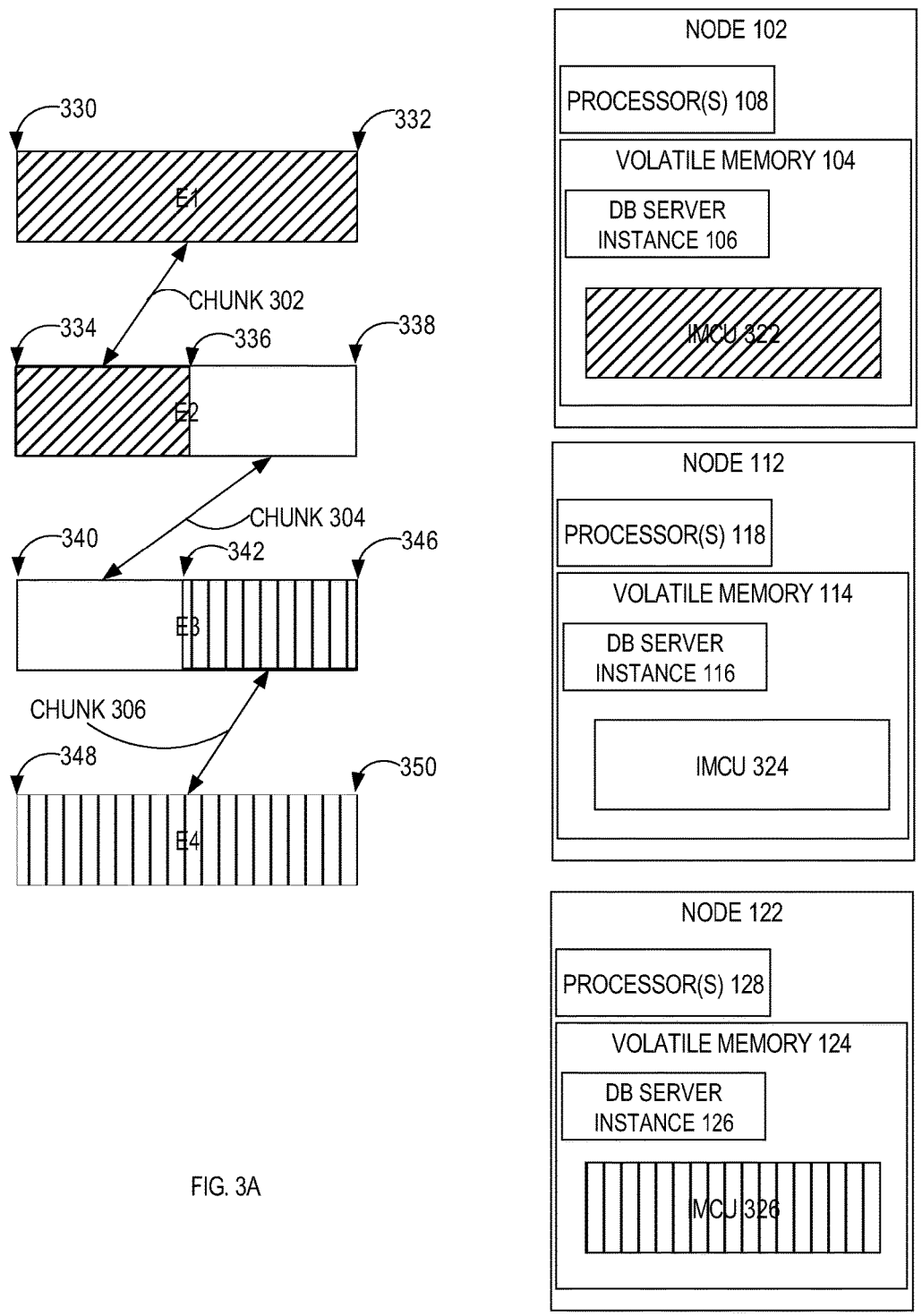
FIG. 3A is a block diagram illustrating a database object divided into chunks and distributed across volatile memory.

"N" is the number of nodes available in the system min_size=minimum threshold for IMCU size M=the highest number by which pims may be divided to produce chunks whose in-memory size is greater than min_size For the purpose of explanation, it shall be assumed that segment S1 has four extents E1, E2, E3 and E4, as illustrated in FIG. 2. It shall be further assumed that database server instance 126 determines that data from these four extents (E1, E2, E3, E4) should be divided into three chunks. Referring to FIG. 3A, it illustrates how the four extents of S1 may be mapped to three chunks 302, 304 and 306. Specifically, data for the first chunk 302 includes all data from extent E1, and some data from extent E2. Data for the second chunk 304 includes the rest of the data from extent E2, and some of the data from extent E3. Finally, data for the third chunk 306 includes the rest of extent E3 and all of extent E4.

Determining Chunk Assignments

Once the data for each chunk has been determined, the load-operation master determines which node will host the IMCU for each chunk. According to one embodiment, the node that is assigned to host the IMCU of any given chunk is determined by applying a hash function to a unique identifier associated with the chunk. For the purpose of illustration, it shall be assumed that the starting address of each chunk is used as the unique identifier for the chunk. However, in alternative embodiments, any other unique identifier for the chunk may be used. In one embodiment, the hash function used for these assignments is a rendezvous hash function. Rendezvous hashing is described in detail at en.wikipedia.org/wiki/Rendezvous_hashing.

In the present example, the rendezvous hash function is applied to the address 330 of the first block of extent E1 to determine the node that is to host the IMCU of chunk 302. According to one embodiment, applying an address 330 to the rendezvous hash function involves:

concatenating a unique identifier of each node (for example the numbers 102, 112, 122) to the address 330, to produce one hash key for each node applying the hash function to each of the three hash keys to produce three hash values, each of which corresponds to one of the nodes the node that corresponds to the highest hash value thus produced is assigned to host the particular node.

In a similar manner, the hash function is used to determine, based on address 336, the node that is to host the IMCU of chunk 304, and to determine, based on address 342, the node that is to host the IMCU of chunk 306. Rendezvous hashing naturally produces desirable effects such as minimal reshuffling during redistribution because the hash values of a particular node/chunk combination do not change, even upon failure of other nodes.

For the purpose of illustration, it shall be assumed that addresses 330, 336, and 342 hash to nodes 102, 112 and 122, respectively. Consequently, node 102 is assigned to host the IMCU for chunk 302, node 112 is assigned to host the IMCU for chunk 304, and node 122 is assigned to host the IMCU for chunk 306. These assignments are illustrated in the chunk-to-node mapping table in FIG. 3B.

Communicating Chunk Assignments

Once the load-operation master has determined the chunk-to-node assignments, the load-operation master broadcasts a message to all other database server instances in cluster 100. According to one embodiment, the message includes various pieces of consistency information, including the target segment metadata (e.g. start address and size of the extents of the target segment), "snapshot information", a list of the database server instances that have been assigned chunks, and "chunk size information".

Snapshot information is information that indicates the state of the target segment that was seen by the load-operation master. The snapshot information is important because that snapshot of the target segment was the basis for the chunk determinations made by the load-operation master. Chunk size information indicates the size of each of chunks 302, 304 and 306. In the case where all chunks are the same size, the chunk size information may be a single size value.

The techniques described herein are not limited to all information being transferred at a single time. For example, the single size value may be pre-stored in each instance to eliminate the need for transferring chunk size information. Along the same lines, in cases where the segment is distributed across all functioning nodes. A list of functioning nodes may be maintained in each instance independently to eliminate the need for transferring a list of database servers that have been assigned chunks.

According to one embodiment, the snapshot information contained in the message sent by the load-operation master may include a snapshot time and an indication of the end of the last extent of the target segment that was seen by the load-operation master. In the present example, the last extent seen by database server instance 126 when making the chunk determination was extent E4. Thus, the snapshot information may include the address 350 of the end of E4. This snapshot information is useful because, between the time the load-operation master determines the chunks and the time the data will actually be loaded, extent E4 may have grown and/or additional extents may have been added to the target segment. Any such post-snapshot data should not be part of the load operation.

The snapshot time indicates the system time at which the load-operation master read the metadata of the target segment. As shall be described hereafter, the snapshot time is used when loading the chunks into memory to ensure that the loaded data reflects the state of the chunks as of the snapshot time.

After sending the message, the load-operation master downgrades the load-master lock from an exclusive lock to a shared lock. In the present example, upon downgrading the load-master lock, database server instance 126 ceases to be the load-operation master for segment S1, and other database server instances can have shared access to segment S1.

Parallel Load Operations

Upon receiving the message from the load-operation master, all nodes that have been assigned to host a chunk send to the lock manager of the target segment a request for a shared mode lock on the target segment. Once the load-operation master has released the exclusive mode lock on the target segment, the lock manager of the target segment grants those shared mode locks.

With the snapshot information and the chunk size information, each database server instance is able to determine the boundaries of each chunk. Having determined the boundaries, each database server instance may apply the same hash function that was used by the load-operation master to determine the chunk-to-node mapping. Thus, in the present example, every database server instance in cluster 100 determines that:

chunk 302 includes address ranges 330-332 and 334-336 and is assigned to node 102
  chunk 304 includes address ranges 336-338 and 340-342 and is assigned to node 112
  chunk 306 includes address ranges 342-346 and 346-350 and is assigned to node 122

Based on this information, each database server instance may build the chunk-to-node mapping illustrated in FIG. 3B. After determining the chunk assignments, each database server instance that has been assigned a chunk proceeds to load the chunk into its local volatile memory. The data of a chunk is read from disk as that data existed at the snapshot time indicated in the message from the load-operation master. Consequently, for the in-memory version of a chunk, data items that were changed after the snapshot time are rolled back to the state in which they existed as of the snapshot time. Such roll-back operations may be performed, for example, based on undo information maintained by the database system.

As mentioned above, the format of the chunk within volatile memory may vary from implementation to implementation. In an embodiment where chunks are transformed into IMCUs, the loading of the chunk may involve reformatting and/or compressing the data item from the chunk. FIG. 3A illustrates the state of cluster 100 after chunks 302, 304 and 306 have been loaded into nodes 102, 112 and 122, respectively, to create IMCUs 322, 324 and 326.

Sub-Chunk-to-Node Mappings

Figure 4:
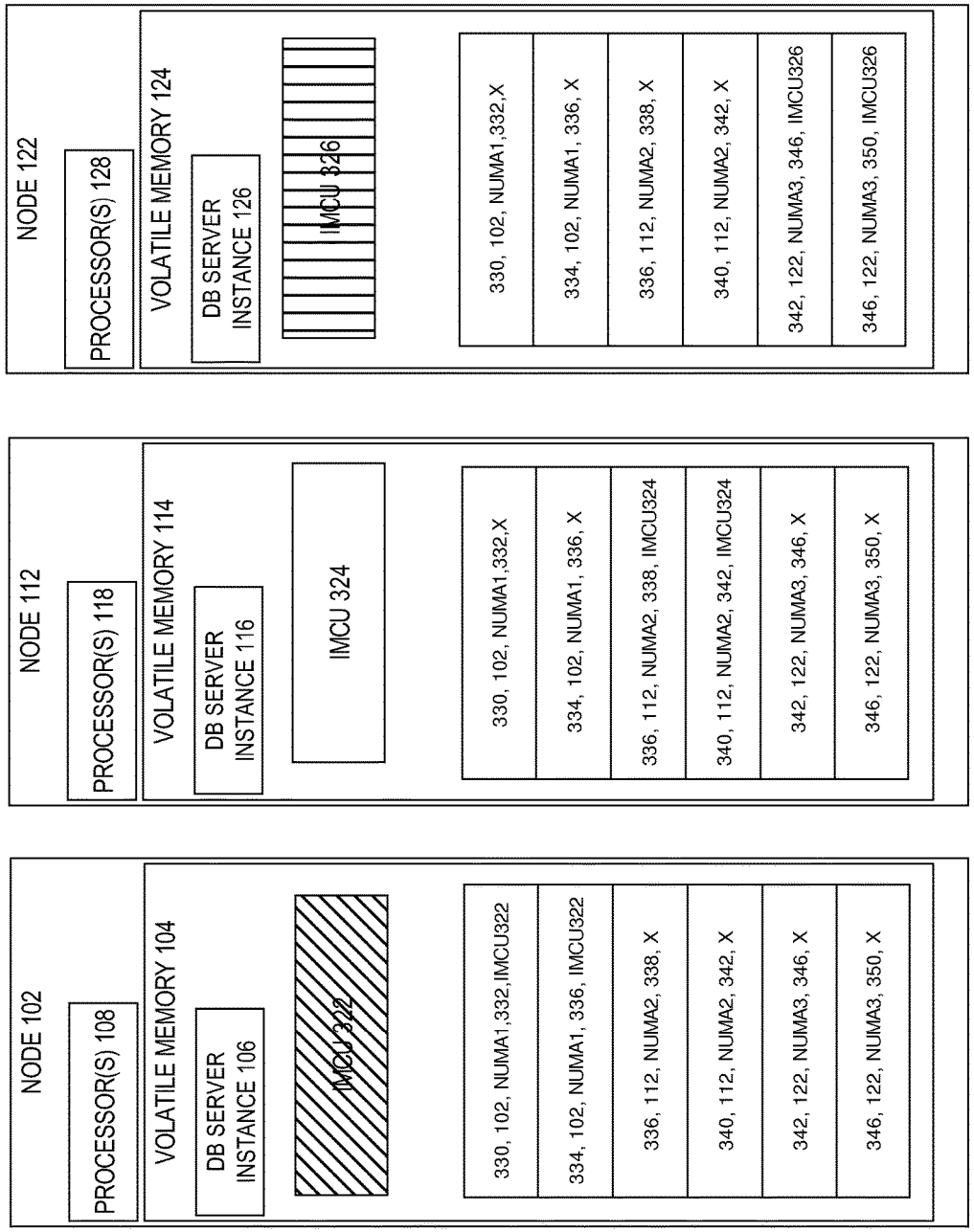
FIG. 4 is a block diagram illustrating a distributed database object in volatile memory of three nodes with an associated chunk-to-node mapping.

A "sub-chunk" is a contiguous set of disk blocks that belong to the same chunk. Typically, a chunk will have at least as many sub-chunks as the number of extents that are spanned by the chunk. For example, each of chunks 302, 304 and 306 span two extents, so each of chunks 302, 304 and 406 have two sub-chunks. In addition to loading any chunk that is assigned to it, each database server instance in cluster 100 stores in its local volatile memory metadata that reflects sub-chunk-to-node mappings that were determined from the information in the message. FIG. 4 is a block diagram that illustrates the sub-chunk-to-node mapping information maintained by nodes 102, 112 and 122, according to one embodiment. In the embodiment illustrated in FIG. 4, each entry in the sub-chunk-to-node mappings a sub-chunk, and has the form (start address, host node, host socket, end address, IMCU pointer), where:

"start address" is the starting disk address of the corresponding sub-chunk
  "host node" is the node that is assigned to host the chunk that contains the corresponding sub-chunk
  "host socket" is the NUMA socket, within the host node, that has most efficient access to the portion of volatile memory containing the IMCU that contains the corresponding sub-chunk (NUMA-based embodiments shall be described in greater detail hereafter).
  "end address" is the end disk address of the corresponding sub-chunk
  "IMCU pointer" is a pointer to the location, within local volatile memory, of the IMCU that contains the data of the corresponding sub-chunk Thus, the first entry in the sub-chunk-to-node mappings within node 102 indicates:

"start address"=address 330 (the start of extent E1)
  "host node"=node 102
  "host socket"=socket 1 within node 102.
  "end address"=address 332 (the end of extent E1)
  "IMCU pointer"=IMCU322 (which represents the starting address, within volatile memory 104, of IMCU 322).

According to one embodiment, entries maintained by one node for sub-chunks that are assigned to another node do not have all pieces of information. For example, the third entry in the sub-chunk-to-node mappings of node 102 indicates:

"start address"=address 336 (the start of chunk 304)
  "host node"=node 112
  "host socket"=socket 2 within node 112.
  "end address"=address 338 (the end of extent E2)
  "IMCU pointer"=X (which indicates that no value is provided).

No IMCU pointer value is provided for sub-chunks that are stored in the volatile memory of other nodes because such information is not meaningful to a node that cannot directly access that volatile memory.

Numa Systems

In non-uniform memory access (NUMA) systems, different computing units within the same node have different access rates to different portions of the local volatile memory. The computing units may correspond to multiple processors within the same node and/or multiple cores within a single processor.

As an example of non-uniform access, assume that a node includes computing units A, B and C, each of which has access to the same local volatile memory. Computing unit A may have faster access to address range 1 of that volatile memory, and slower access to ranges 2 and 3. On the other hand, computing unit B may have faster access to range 2, and slower access to ranges 1 and 3. Finally, computing node C may have faster access to range 3, and slower access to ranges 1 and 2.

In such systems, the load operation master may not simply assign chunks to nodes, but may assign chunks to (node/computing unit) combinations. The selection of which computing unit to assign to a chunk may be performed using a hash function in a manner similar to the database server instance-selection technique described above. When a node receives the message from the load-operation master that assigns a chunk to a particular computing unit of the node, the node loads that chunk into the range of volatile memory to which the designated computing unit has faster access.

Redistribution of Chunk Assignments

When a node fails, the IMCUs stored in that node's volatile memory cease to be available for query processing. When a new node is added to a cluster, the volatile memory of the new node becomes available for storing IMCUs. In both of these scenarios, reassignment of some IMCUs is necessary for optimal operation of the cluster.

For example, if node 112 fails, IMCU 324 is no longer available for processing queries that access data items that belong to chunk 304. Ideally, the redistribution of load assignments takes place without having to reassign chunks that are loaded into the nodes that did not fail. Thus, failure of node 112 should not cause chunk 302 or chunk 306 to be reassigned, because data from these chunks reside in the volatile memories of nodes 102 and 122, respectively, which have not failed.

The nature of a rendezvous hash function is such that keys only hash to nodes that are currently considered "candidates" for chunk assignments. Therefore, in response to the failure of node 112, node 112 ceases to be considered a candidate by the hash function. With the change to the set of candidate nodes, the starting addresses of chunks 302 and 306 that are assigned to the non-failed nodes will continue to hash to nodes 102 and 122 respectively. However, because node 112 has ceased to be a candidate, the starting address of chunk 304 will no longer hash to node 112. Instead, the starting address of chunk 304 may hash to node 102. This remains true until either node 102 fails or node 112 is recovered and established once again as a candidate. When node 112 is established once again as a candidate, the starting address of chunk 304 will once again hash to node 112.

Whenever a database server instance receives a request that targets a particular chunk, the database server instance uses the hash function to determine the host node of the particular chunk, and compares the hash-function-determined-host with the host node of the particular chunk indicated in the chunk-to-node map (the "map-specified-host"). If the database server instance determines that the hash-function-determined-host is different than map-specified-host, then the database server instance updates the corresponding entries for the particular chunk in its chunk-to-node mappings and its sub-chunk-to-node mappings. In addition, if a database server instance determines that it itself is the new host node of the particular chunk, then the database server instance loads the chunk into its volatile memory. On the other hand, if a database server instance determines that it itself was the old host node of the particular chunk, and that the particular chunk now maps to another node, then the database server instance can discard from its volatile memory the container that holds the data from the chunk.

For example, assume that, after node 112 fails, address 336 (the start of chunk 304) hashes to node 102 instead of node 112. Under these circumstances, database server instance 106 will detect the discrepancy:

node 102 is the hash-function-determined-host,
node 112 is the map-specified host In response to detecting this discrepancy, database server instance 106 will update the entries associated with chunk 304 to indicate that node 102 is now the host for chunk 304. Database server instance 106 will then proceed to load chunk 304 into its volatile memory 104, thereby creating a new copy of IMCU 324. The new copy of IMCU 324 may be built with data from a snapshot that is different than the snapshot used to create the original copy of IMCU 324. As a result, already existing IMCUs in live nodes will be of earlier snapshots and the new ones of later snapshots. However, as long as a query is issued at a snapshot later than the snapshot of the new IMCUs, all existing and new IMCUs can be used to process the query.

Figure 5:
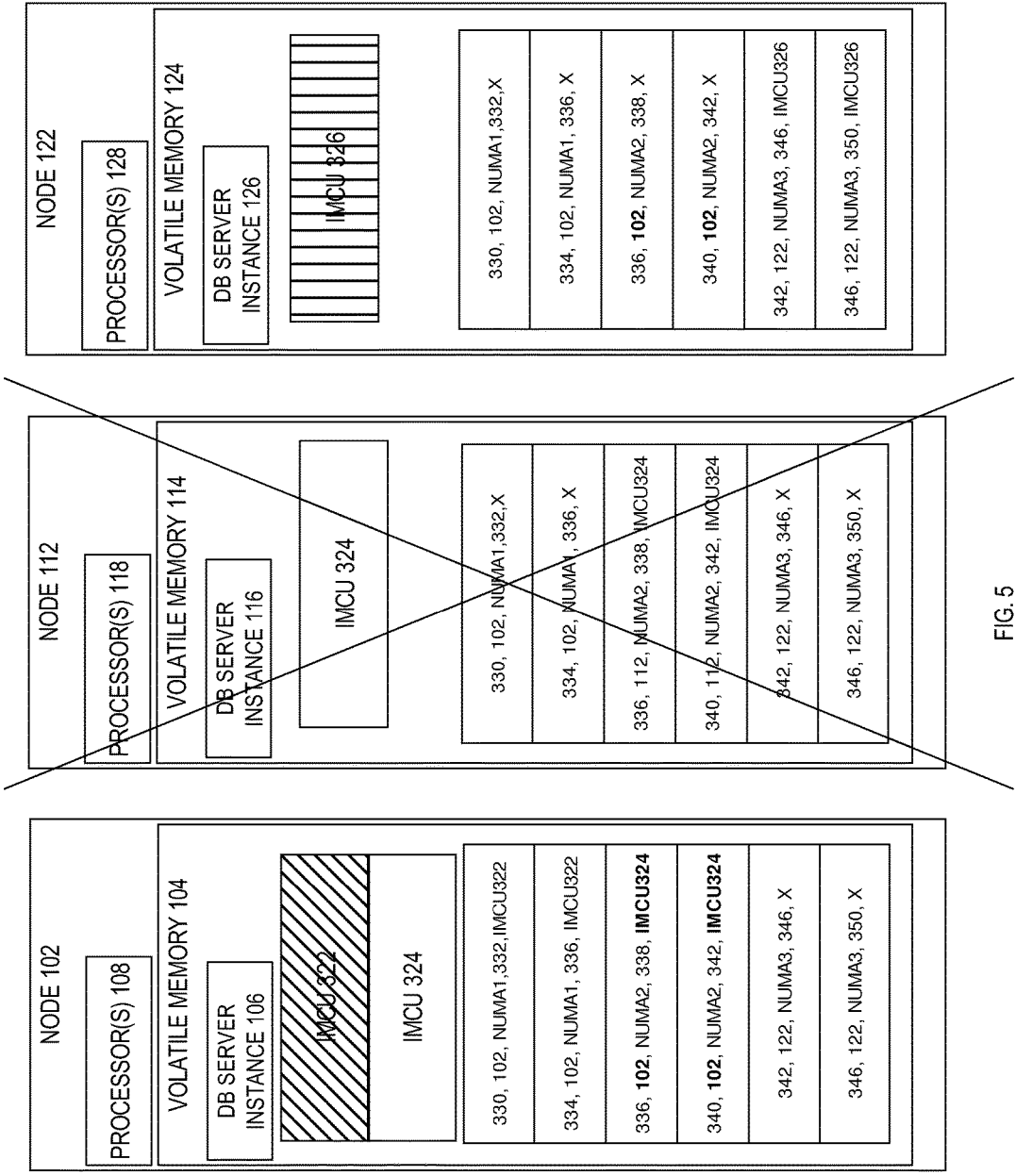
FIG. 5 is a block diagram illustrating a distributed database object in volatile memory of two nodes with an associated chunk-to-node mapping after a node failure has occurred.

Database server instance 126 will also detect the discrepancy and update the appropriate sub-chunk-to-node entries in its sub-chunk-to-node mapping. However, because database server instance 126 is not on the new host node, database server instance 126 will not load the chunk 304 into its volatile memory 124. Referring to FIG. 5, it illustrates the state of the cluster 100 after node 112 has failed, database server instances 106 and 126 have updated their sub-chunk-to-node mappings, and database server instance 106 has created the new copy of IMCU 324 from the data in chunk 304.

When node 112 is recovered and established as a candidate, nodes 102 and 112 will once again detect discrepancies between the hash-function-determined host for chunk 304, and the map-specified host for chunk 304. In response to detecting these discrepancies, database server instances 106 and 126 will update their sub-chunk-to-node mappings. In addition, database server instance 106 discards its copy of IMCU 324, and database server instance 116 creates a new copy of IMCU 324 based on the data from chunk 304. Thus, cluster 100 returns to the state illustrated in FIG. 4.

Embodiments have been described herein in which a node that is assigned a chunk builds the IMCU for that chunk from on-disk data. However, in alternative embodiments, a node that is newly-assigned to host a chunk may determine that a previous host of that chunk is available. This may occur, for example, when the new host is a node that is newly-added to a cluster, and the old host did not fail. Under these circumstances, the new host may request the old host to send the corresponding IMCU data to the new host over the node-to-node interconnect. While sending IMCU data from one host to another may result in a significant amount of message traffic, the overhead of that traffic may be less than the performance impact of rebuilding an IMCU from on-disk data.

Handling Access Requests

IMCUs 322, 324 and 326 are only useful if used to improve the performance of queries that access data in segment S1. Therefore, according to one embodiment, all database server instances in cluster 100 respond to queries that target data from segment S1 by breaking the operation requested by the query into work granules, and distributing those granules based on which node/database server instance/computing unit is hosting the targeted data.

For example, assume that database server instance 106 receives a query to scan the entire segment S1. In response, database server instance 106 creates a first set of one or more work granules to scan the data that resides in chunk 302, a second set of one or more work granules to scan the data that resides in chunk 304, and a third set of one or more work granules to scan data that resides in chunk 306.

After creating the three sets of work granules, database server instance 106 uses its local copy of the chunk-to-node mapping to determine that the first set of work granules should be performed locally by computing unit NUMA1. The second set of work granules should be sent to node 112 to be performed by computer unit NUMA2. The third set of work granules should be sent to node 122 to be performed by computing unit NUMA3.

Each node executes the work granules assigned to it, taking advantage its local in-memory copy of the chunk that it is hosting. Each node then provides its results back to the node that received the query, and that node provides the results back to the database application that issued the query.

Consistent Maps Across the Nodes

Because each node is able to independently execute the hash function that is used to determine the distribution of chunks among the various nodes, each node is able to independently maintain its chunk-to-node mappings consistent with the mappings maintained by each other node, while requiring little to no cross-database server instance communication to keep the mappings in sync. Thus, the approaches described herein allow parallel query processing to take advantage of the increased amount of volatile memory available in a multi-node system, while minimizing the cross-database server instance communication required for each of the nodes to determine in which other node an in-memory version of each particular chunk has been loaded.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
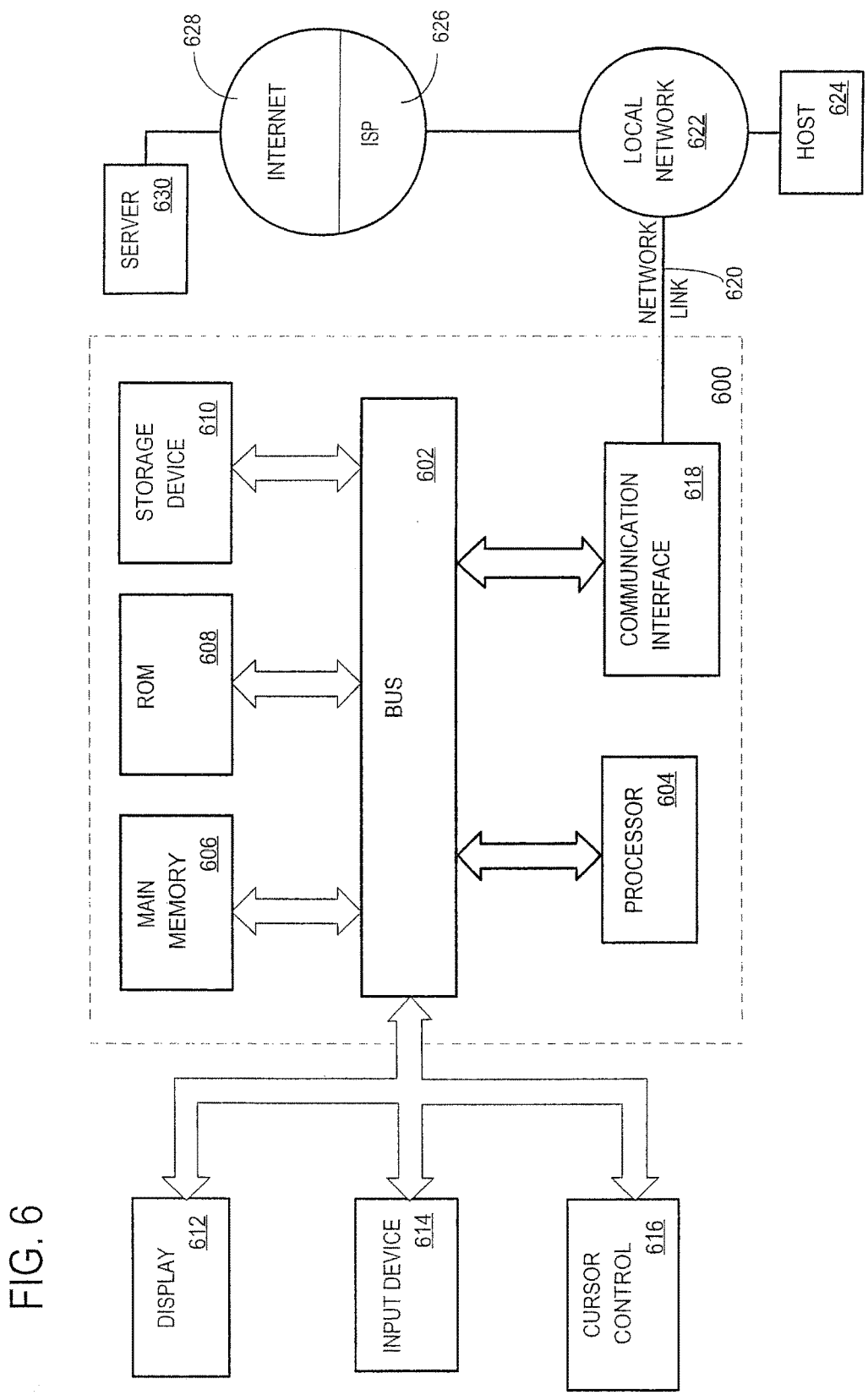
FIG. 6 is a block diagram illustrating a computer system that may be used to implement the techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   establishing a single database server instance, from a plurality of database server instances, as a load-operation master for a particular set of data;
   wherein each database server instance of the plurality of database server instances is executing on corresponding node of a plurality of nodes in a multi-node cluster;
   wherein each database server instance of the plurality of database server instances has shared access to a single on-disk version of the particular set of data;
   determining, by the single database server instance, how to divide the particular set of data into a plurality of chunks;
   broadcasting, by the single database server instance, a message to other database server instances in the multi-node cluster;
   wherein the message includes data that defines the plurality of chunks;
   based, at least in part, on the data that defines the plurality of chunks, each given database server instance of the plurality of database server instances independently performing the steps of:
      creating, in volatile memory that is local to the given database server instance, a mapping that indicates a host node for each chunk of the plurality of chunks; and
      for each target chunk, of the plurality of chunks, that is to be hosted by the node that is executing the given database server instance, the given database server instance loading data from the target chunk into volatile memory that is local to the given database server instance;
   wherein the host node for each chunk is determined by applying a particular hash function to a unique identifier of the chunk.

2. The method of claim 1 wherein, to create the mapping, each database server instance of the plurality of database server instances independently uses the particular hash function to determine the host node for each chunk.

3. The method of claim 1 wherein:
   the particular set of data is a segment that comprises a plurality of extents;
   the plurality of extents include a particular extent;
   the plurality of chunks include a first chunk and a second chunk; and
   the data that defines the plurality of chunks indicates that a first portion of the particular extent belongs to the first chunk, and a second portion of the particular extent belongs to a second chunk.

4. The method of claim 1 wherein:
   the particular set of data is a segment that comprises a plurality of extents;
   the plurality of extents include a first extent and a second extent;
   the plurality of chunks include a particular chunk; and
   the data that defines the plurality of chunks indicates that at least a portion of the first extent belongs to the particular chunk, and at least a portion of the second extent belongs to the particular chunk.

5. The method of claim 1 further comprising:
   in response to load-triggering events, multiple database server instances requesting, from a lock manager associated with the particular set of data, an exclusive lock to become the load-operation master for the particular set of data; and wherein establishing the single database server instance as the load-operation master includes the lock manager granting the exclusive lock to only the single database server instance.

6. The method of claim 5 further comprising the single database server instance releasing the exclusive lock after broadcasting the message.

7. The method of claim 1, wherein:
the message includes snapshot information; and
loading data from the chunk into volatile memory that is local to the given database server instance includes each database server instance using the snapshot information when loading data for a chunk to load the data as of a snapshot time.

8. The method of claim 1, further comprising:
after failure of a node in the cluster, each given database server instance, of the database server instances that have not failed, independently performing the steps of:
based on the hash function, changing the mapping for each chunk that was initially hosted by a particular database server instance on the node that failed to indicate that the chunk is hosted by a corresponding database server instance that is on a node that did not fail; and
in response to determining that a set of one or more target chunks are newly hosted by the given database server instance, loading data from the set of one or more target chunks into volatile memory that is local to the given database server instance.

9. The method of claim 8 further comprising:
after the node is recovered, each given database server instance of the plurality of database server instances independently performing the steps of:
based on the hash function, changing the mapping for each chunk that was initially hosted by the particular database server instance to indicate that the chunk is once again hosted by the particular database server instance; and
in response to determining that a set of one or more target chunks are no longer hosted by the given database server instance, discarding the set of one or more target chunks from volatile memory that is local to the given database server instance;
after the node is recovered, the particular database server instance loading each chunk that was initially hosted by the particular database server instance into volatile memory that is local to the particular database server instance.

10. The method of claim 1, wherein the step of loading data from the target chunk into volatile memory that is local to the given database server instance includes compressing data from the target chunk to create an in-memory compression unit in volatile memory that is local to the given database server instance.

11. The method of claim 1, wherein the load-operation master determines how to divide a target segment into chunks based, at least in part, on a predicted size of compressed data from the target segment.

12. The method of claim 1, wherein the step of loading data from the target chunk into volatile memory that is local to the given database server instance includes reformatting data from the target chunk to produce an in-memory version of the data that has a different format than the on-disk version of the data.

13. The method of claim 1, wherein:
a particular node of the plurality of nodes is a NUMA node having a plurality of computing units;
the mapping further indicates, for a chunk that is hosted by the particular node, a specific computing unit of the plurality of computing units;
within the particular node, loading data for the chunk in a region of volatile memory that is associated with the specific computing unit.

14. One or more non-transitory computer-readable media storing instructions which, when executed by one or more hardware processors, cause performance of a method comprising:
establishing a single database server instance, from a plurality of database server instances, as a load-operation master for a particular set of data;
wherein each database server instance of the plurality of database server instances is executing on corresponding node of a plurality of nodes in a multi-node cluster;
wherein each database server instance of the plurality of database server instances has shared access to a single on-disk version of the particular set of data;
determining, by the single database server instance, how to divide the particular set of data into a plurality of chunks;
broadcasting, by the single database server instance, a message to other database server instances in the multi-node cluster;
wherein the message includes data that defines the plurality of chunks;
based, at least in part, on the data that defines the plurality of chunks, each given database server instance of the plurality of database server instances independently performing the steps of:
creating, in volatile memory that is local to the given database server instance, a mapping that indicates a host node for each chunk of the plurality of chunks;
wherein the host node for each chunk is determined by applying a particular hash function to a unique identifier of the chunk; and
for each target chunk, of the plurality of chunks, that is to be hosted by the given database server instance, the given database server instance loading data from the target chunk into volatile memory that is local to the given database server instance.

15. The one or more non-transitory computer-readable media of claim 14 wherein, to create the mapping, each database server instance of the plurality of database server instances independently uses the particular hash function to determine the host node for each chunk.

16. The one or more non-transitory computer-readable media of claim 14 wherein:
the particular set of data is a segment that comprises a plurality of extents;
the plurality of extents include a particular extent;
the plurality of chunks include a first chunk and a second chunk; and
the data that defines the plurality of chunks indicates that a first portion of the particular extent belongs to the first chunk, and a second portion of the particular extent belongs to a second chunk.

17. The one or more non-transitory computer-readable media of claim 14 wherein:
the particular set of data is a segment that comprises a plurality of extents;
the plurality of extents include a first extent and a second extent;

the plurality of chunks include a particular chunk; and the data that defines the plurality of chunks indicates that at least a portion of the first extent belongs to the particular chunk, and at least a portion of the second extent belongs to the particular chunk.

18. The one or more non-transitory computer-readable media of claim 14, wherein the method further comprises:

in response to load-triggering events, multiple database server instances requesting, from a lock manager associated with the particular set of data, an exclusive lock to become the load-operation master for the particular set of data; and wherein establishing the single database server instance as the load-operation master includes the lock manager granting the exclusive lock to only the single database server instance.

19. The one or more non-transitory computer-readable media of claim 18, wherein the method further comprises the single database server instance releasing the exclusive lock after broadcasting the message.

20. The one or more non-transitory computer-readable media of claim 14, wherein:

the message includes snapshot information; and loading data from the chunk into volatile memory that is local to the given database server instance includes each database server instance using the snapshot information when loading data for a chunk to load the data as of a snapshot time.

21. The one or more non-transitory computer-readable media of claim 14, wherein the method further comprises:

after failure of a node in the cluster, each given database server instance, of the database server instances that have not failed, independently performing the steps of:

based on the hash function, changing the mapping for each chunk that was initially hosted by a particular database server instance on the node that failed to indicate that the chunk is hosted by a corresponding database server instance that is on a node that did not fail; and in response to determining that a set of one or more target chunks are newly hosted by the given database server instance, loading data from the set of one or more target chunks into volatile memory that is local to the given database server instance.

22. The one or more non-transitory computer-readable media of claim 21, wherein the method further comprises:

after the node is recovered, each given database server instance of the plurality of database server instances independently performing the steps of:

based on the hash function, changing the mapping for each chunk that was initially hosted by the particular database server instance to indicate that the chunk is once again hosted by the particular database server instance; and in response to determining that a set of one or more target chunks are no longer hosted by the given database server instance, discarding the set of one or more target chunks from volatile memory that is local to the given database server instance;

after the node is recovered, the particular database server instance loading each chunk that was initially hosted by the particular database server instance into volatile memory that is local to the particular database server instance.

23. The one or more non-transitory computer-readable media of claim 14, wherein the step of loading data from the target chunk into volatile memory that is local to the given database server instance includes compressing data from the target chunk to create an in-memory compression unit in volatile memory that is local to the given database server instance.

24. The one or more non-transitory computer-readable media of claim 14, wherein the load-operation master determines how to divide a target segment into chunks based, at least in part, on a predicted size of compressed data from the target segment.

25. The method of claim 14, wherein the step of loading data from the target chunk into volatile memory that is local to the given database server instance includes reformatting data from the target chunk to produce an in-memory version of the data that has a different format than the on-disk version of the data.

26. The one or more non-transitory computer-readable media of claim 14, wherein:

a particular node of the plurality of nodes is a NUMA node having a plurality of computing units;

the mapping further indicates, for a chunk that is hosted by the particular node, a specific computing unit of the plurality of computing units;

within the particular node, loading data for the chunk in a region of volatile memory that is associated with the specific computing unit.

* * * * *

UNITED STATES PATENT AND TRADEMARK OFFICE
CERTIFICATE OF CORRECTION

PATENT NO. : 9,875,259 B2
APPLICATION NO. : 14/565906
DATED : January 23, 2018
INVENTOR(S) : Niloy Mukherjee et al.

Page 1 of 1

It is certified that error appears in the above-identified patent and that said Letters Patent is hereby corrected as shown below:

Column 14
Claim 1: Line 29: Delete "indicates a" and insert --indicates a respective--.

Column 16
Claim 13: Line 7: Delete "within" and insert --the method further comprises, within--.
Claim 14: Line 36: Delete "indicates a" and insert --indicates a respective--.

Column 18
Claim 25: Line 30: Delete "method" and insert --one or more non-transitory computer-readable media--.
Claim 26: Line 43: Delete "within" and insert --the method further comprises, within--.

Signed and Sealed this
Eighth Day of May, 2018

Andrei Iancu
*Director of the United States Patent and Trademark Office*